Aug. 19, 1924.
H. O. ROCKROHR
GATE
Original Filed Nov. 28, 1921   2 Sheets-Sheet 2
1,505,923
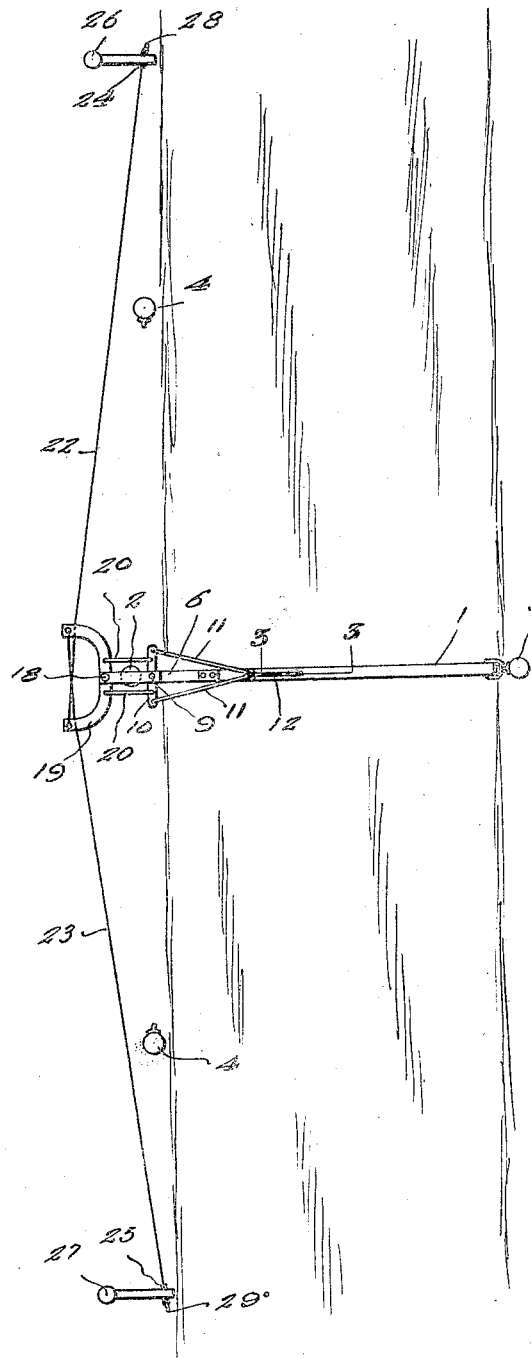
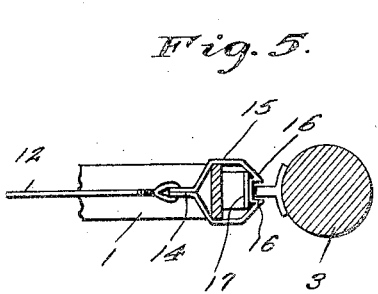
Fig. 5.
Fig. 2.
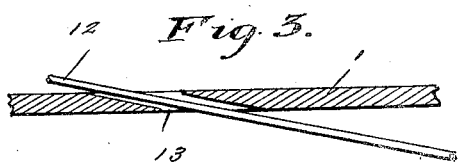
Fig. 3.
H. O. Rockrohr, INVENTOR
BY
ATTORNEY
WITNESSES Patented Aug. 19, 1924.

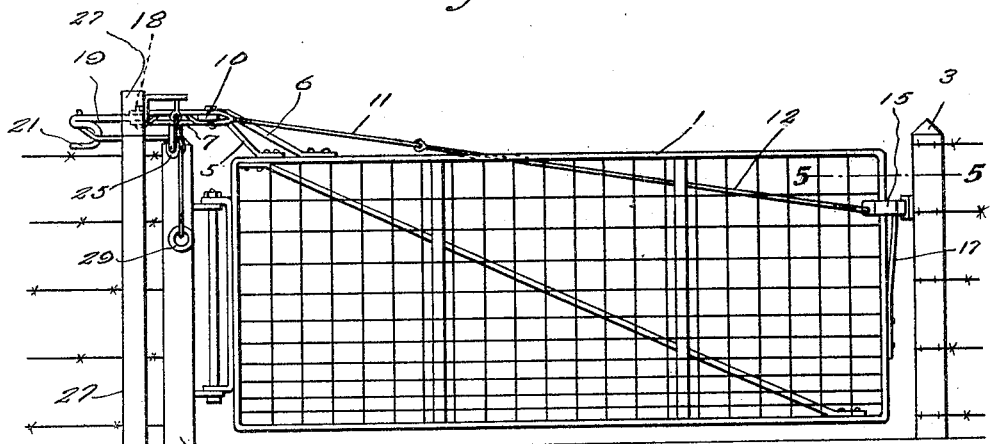
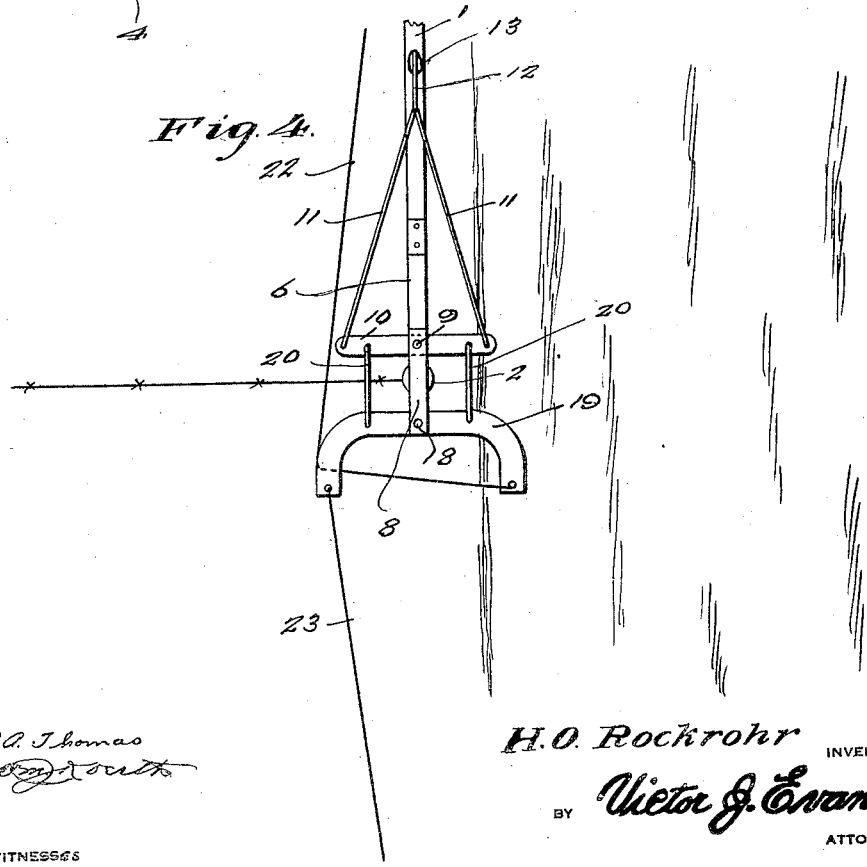

1,505,923

UNITED STATES PATENT OFFICE.

HARRY O. ROCKROHR, OF DELMAR, IOWA.

GATE.

Application filed November 28, 1921, Serial No. 518,272. Renewed June 11, 1924.

*To all whom it may concern:*

Be it known that I, HARRY O. ROCKROHR, a citizen of the United States, residing at Delmar, in the county of Clinton and State of Iowa, have invented new and useful Improvements in Gates, of which the following is a specification.

My present invention has reference to farm gates of that class in which chains or cables are connected to elements associated with the gate and a pull on one of said chains will cause the gate to be swung to an open position, while a pull upon the other chain, which terminates to the opposite side of the gate will return the gate to closed position.

The object of the present invention is to simplify and improve the existing art by producing a gate and operating means therefor in the nature of pull cords or chains and latch mechanism associated therewith whereby the gate will be positively retained closed, positively swung to open position by a pull on the cable nearest a person or vehicle approaching the gate, sustained in said open position until after passage has been made through the gateway, and returned to closed and latched position through the medium of a pull upon the second cable.

Many other objects and advantages will present themselves as the nature of the invention is better understood, reference being had to the drawings which accompany and which form part of this specification.

In the drawings:—

Figure 1 is an elevation looking toward the gate when the same is in closed position.

Figure 2 is a top plan view thereof.

Figure 3 is a sectional view on the line 3—3 of Figure 2.

Figure 4 is a view showing the gate in open position.

Figure 5 is a sectional view on the line 5—5 of Figure 1.

The gate is indicated by the numeral 1, the post to which it is hinged by the numeral 2, the abutment post, to which the gate is latched when in closed position, by the numeral 3. If desired, there may be arranged to the opposite sides of the hinge post 2 latch posts 4 which may be engaged by the latch of the gate for holding the gate in open position on each side of the hinge post.

The gate may be of any desired construction, but is preferably formed of metal, and has secured to its top, adjacent its hinge, brackets 5 and 6 respectively. The bracket 5 is arranged below the bracket 6, and each of the brackets is provided with rearwardly extending arms, indicated by the numerals 7 and 8 respectively. Between the parallel arms, at their juncture with the angle portions of the brackets there is centrally pivoted, as at 9, a bar 10. The bar is in the nature of a metal plate and has secured in openings adjacent to the ends thereof strands of cables or of light chains 11 respectively. These flexible elements 11 have their ends connected to a longer flexible element 12 which may be also either in the nature of a cable or chain, the element 12 passing through a suitable opening 13 in the top bar of the gate and being secured to the bail 14 of a latch 15. The bail surrounds the outer vertical member or post of the gate, the latch member comprising two spaced jaws 16 respectively, and on the said outer vertical member of the gate there is a flat spring 17 which has its lower end secured to the gate and its upper and free end received in the latch between the jaws, and whereby the jaws are caused to move outwardly and to engage with the post 3 when the gate is closed or with the posts 4 when the gate is open. The jaws have their inner ends straight and parallel, but their outer portions are rounded to the sides of the bail.

Pivoted, as at 18 between the arms 7 and 8, adjacent to the ends of the said arms is the central portion of a yoke 19. Loosely connected to the central and straight portion of the yoke 19, and likewise loosely connected to the bar 10, and arranged to the opposite sides of the arms 7 and 8, are links 20 respectively. The outer and rounded ends of the yoke 19 are bent upon themselves or otherwise arched inwardly and outwardly, providing curved guides 21. Secured to the end of each yoke is a flexible element which may be in the nature of a cable or a chain. These elements are indicated by the numerals 22 and 23 respectively, and are oppositely directed so that one crosses the other at the center of the yoke and so that each of the said flexible elements is received in one of the guides 21 at the ends of the yoke. The elements 22 and 23 are in the nature of pull cords and are directed over suitable grooved wheels 24 and 25 respectively which may be supported upon lateral arms of posts 26 and 27 respectively or which may be connected directly to the said posts. The ends of the pull cords 22 and 23 are, of course, directed downwardly with respect to the posts 26 and 27 and the said ends are provided with handles 28 and 29 respectively. The posts 26 and 27 are arranged in a line with the latch posts 4 and are positioned a considerable distance away from the gate. It will be apparent that a pull upon say the handle 28, the pull cord 22 will be drawn taut, and as a consequence will swing the yoke 19 on its pivot 18. This will draw on one of the links 20, causing the same to swing the bar 10 which exerts a pull upon the flexible element 11, drawing on the flexible element 13 and consequently moving the latch against the pressure of its spring to bring the same out of engagement with the post 3. A further pull upon the said cable 22 will cause the gate to be swung to open position to bring the same opposite one of the latch posts 4, and the latch of the gate in engagement with the said post. The second cable 23 has its end which is connected to one end of the yoke arranged at an oblique angle with respect to the main strand thereof and it will be apparent that a pull upon the handle 29 will draw upon the pull cord 23 causing the portion thereof received in the guide to swing the said guide, and in so doing also swing the yoke which, through the medium of the second link 20 will likewise swing the bar 10 which will draw upon the second flexible element 12 to pull upon the flexible element 13 to bring the latch 15 out of engagement with the latch post 4, and a further pull upon the said cable 23 will return the gate to closed position. One of the rounded sides of the latch will pass over the post 3, or over a keeper plate provided upon the said post, but when the jaws of the latch receive therein either the keeper plate or the post the gate will be effectively locked in closed position.

It is thought that the foregoing description, when taken in connection with the drawings will fully set forth the construction and advantages of the improvement, but it is to be stated that I do not wish to limit myself to the precise structural features herein set forth, and that I am entitled to all such departures therefrom as fall within the scope of what is claimed.

Having described the invention, I claim:

A hinged gate of the character described comprising a pair of brackets secured to the upper portion of the frame thereof one extending in advance of the other and arranged one above the other, an arm formed on each bracket and the arm being spaced in parallelism to provide bearing members, a bar pivoted midway at the ends of the arms and adjacent the meeting point of the brackets therewith, flexible elements secured to the respective ends of the bar and converging therefrom toward the central portion of the gate, a long flexible element secured to the ends of the converging flexible elements, and adapted to pass through an opening in the upper horizontal portion of the frame, a bail mounted for horizontal reciprocation around the free vertical portion of the frame and receiving the opposite end of the longer flexible element, a yoke pivoted between the free ends of the arms, parallel links loosely connecting the yokes with the bar, curved guide members formed on each end of the yoke, receiving posts arranged in the path of the gate on each side thereof and in the front respectively, cable carrying posts disposed beyond the side securing posts, a pulley for each cable carrying post, cables secured to each end of the yoke, said last-mentioned cables crossing between the ends of the yoke thence trained over the guide members and extended to be received by the pulleys and a latched receiving member on each of the securing posts for the purpose specified.

In testimony whereof I affix my signature.

HARRY O. ROCKROHR.